May 30, 1961  E. C. RHYNE, JR  2,986,690
BATTERY CHARGING APPARATUS
Filed Oct. 27, 1959  3 Sheets-Sheet 3

2,986,690
Patented May 30, 1961

2,986,690
BATTERY CHARGING APPARATUS

Earl C. Rhyne, Jr., East Pepperell, Mass., assignor to The Warren Manufacturing Company, Inc., Littleton, Mass., a corporation of Massachusetts Filed Oct. 27, 1959, Ser. No. 849,050

11 Claims. (Cl. 320—32)

My invention relates to power rectifying apparatus for charging electric storage batteries such as central-office batteries in exchanges of communication systems.

In a more particular aspect, my invention relates to battery chargers exclusively composed of solid-state components, including a power rectifier of the magnetic amplifier type controlled and regulated by means of transistors or other controllable semiconductor rectifier devices of the junction type. Such battery chargers combine the advantages of compact design and minimum maintenance requirements. However, the chargers of this type, as heretofore available, have some inherent limitations which manifest themselves particularly in cases where especially exacting requirements, such as those described presently, are to be satisfied.

It is usually necessary to equip the battery chargers with a no-charge relay which issues an alarm signal or initiates a controlling action in the event an inadequate current is flowing from the charger terminals into the battery being charged so that there is danger of damaging the battery. Although the available battery chargers with such a failure-responsive relay afford satisfactory protection for some applications, the response to failure is unreliable or not obtainable when extreme accuracy requirements must be met. For example, the normal value of current required for "floating" a lead-antimony battery when fully charged is about 2 to 3% of the full-rate charging current. Hence, adequate protection is obtained if the charger is provided with a failure-responsive relay capable of responding when the current value drops below 2 to 3%. This requirement, though near the limit of the known chargers, can still be met thereby. However, the protection from charger failure is much more problematical where lead-calcium batteries are involved. When such a battery is charged, the amount of current required for keeping the battery under floating voltage, is extremely slight, being about 1/10 to 1/15 of that needed for a comparable lead-antimony battery. A no-charge relay, therefore, would have to respond to reduction of current below this minute value, and this cannot be achieved with the known charger systems.

It is, therefore, one of the objects of my invention to devise a battery charger with failure-responsive relay means capable of reliably responding to such exacting requirements as outlined above, for example, in conjunction with lead-calcium batteries.

Another object of my invention is to devise power-rectifying battery chargers that are inherently capable of performing a desired sequencing operation when used in parallel. The significance of this object will appear from the following.

Assume that a group of chargers, for instance three, are connected in parallel to the same battery buses to meet any power demand up to the total current capacity of the group. A battery charger operates most economical when it carries its full rated load but has low efficiency at reduced load. It is conventional practice, therefore, to connect only one of the chargers to the buses when the load on the battery is small enough to be carried by a single charger up to its full rating. A second charger is added only when the load increases beyond the current limit capacity of the first charger, and so forth. The present practice in central offices is to provide a selector mechanism which operates to sequentially connect one, two, or more chargers to the battery buses in a given order and depending upon the battery load exceeding the rated current limit value of the charger or chargers previously in operation.

The need for such selector mechanisms, associated measuring instrumentalities and control equipment involves considerable amounts of investment, space requirements, and maintenance work. It is, therefore, a more specific object of my invention to do away with selector devices separate from the chargers by making the paralleled chargers inherently capable of selective sequencing operation, and to afford setting or changing at will the particular sequence in which the paralleled chargers of a group are to commence operating.

It is another object of my invention, akin to, and more general than those mentioned above, to greatly increase the sensitivity and accuracy of the self-regulating performance of the power-rectifying battery charger compared with the chargers heretofore available.

These and other objects and advantages of my invention, as well as its novel features set forth in the claims annexed hereto, will be apparent from, and will be described in, the following with reference to the embodiment of the invention illustrated, by way of example, on the accompanying drawings in which:

Figure 1:
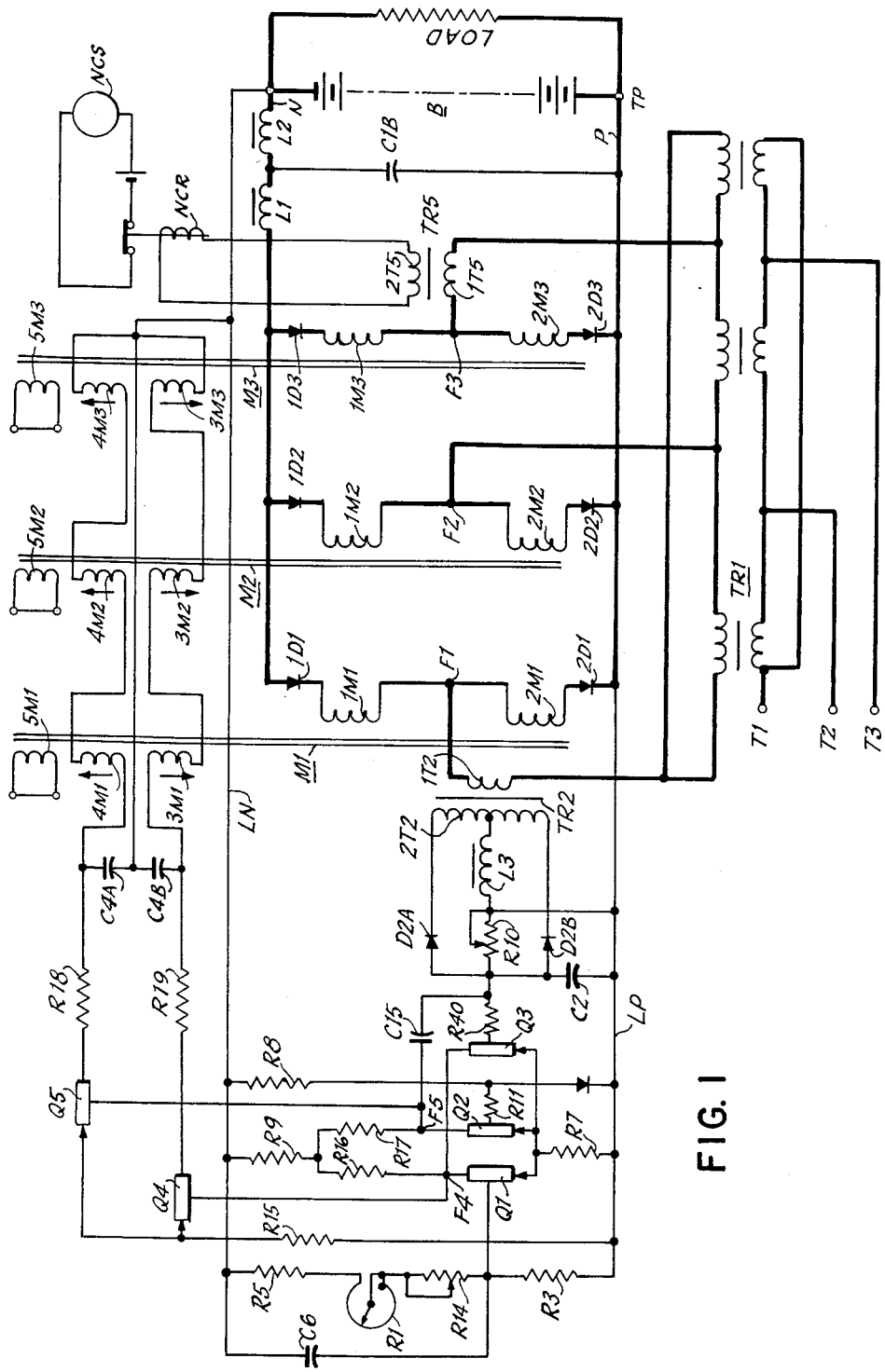
Fig. 1 is a circuit diagram of a battery charger system.

The power-rectifying battery charger according to Fig. 1 is partly similar to the one illustrated and described in the copending application Serial No. 822,229, filed June 23, 1959, in the name of Warren J. Dornhoefer, and constitutes an improvement over that charger relative to the above-outlined objects of my invention, the essential points of departure being emphasized hereinbelow. It should be understood, however, that my invention is also applicable to other designs of battery chargers of the static type combining solid-state power rectifiers with solid-state control and regulating components of any suitable kind and circuitry.

The system illustrated in Fig. 1 serves to charge a battery B from a source of alternating power current by regulated charging voltage. The alternating current is supplied to the terminals T1, T2, T3 of a three-phase transformer TR1 whose secondary windings are connected to the power input points F1, F2, F3 of a three-phase magnetic amplifier network which comprises the three pairs of alternating-current windings 1M1 and 2M1, 1M2 and 2M2, 1M3 and 2M3 of three saturable reactors M1, M2 and M3, each winding being connected in series with one of six respective diodes 1D1 and 2D1 and 2D2, 1D3 and 2D3, consisting of silicon power rectifiers. The rectified output of the amplifier network is fed through a filter choke L1 into a capacitor blank C1B which, in combination with another choke L2, forms an input filter through which the charger voltage is impressed across the battery buses P and N to which the battery B as well as a substantially resistive load is connected, the charge system, in addition to charging and floating the battery, supplies all of the current to the bus load up to the current-limit capacity of the charger.

The core of the saturable reactor M1 is provided with two direct-current control windings 3M1, 4M1 and an auxiliary winding 5M1. Reactors M2 and M3 have corresponding windings 3M2, 4M2, 5M2 and 3M3, 4M3, 5M3. During normal operation of the battery charger, the auxiliary windings 5M1, 5M2 and 5M3 are short-circuited to reduce the amount of A.-C. harmonic voltage which may appear across the control windings 3M1, 4M1, 3M2, 4M2, 3M3, 4M3. This prevents large alternating voltages from appearing across the collectors of the sum-network transistors described below. The shorting windings 5M1, 5M2, 5M3 also afford controlling the reactors with much smaller currents in winding 3M1 to 3M3 and 4M1 to 4M3 than otherwise required. This is because the presence of the shorting windings permits giving the other windings more turns and has the advantage of reducing the idle-charger current requirements.

The three control windings 3M1, 3M2 and 3M3 are connected in a single direct-current control circuit in which the direction of current flow is such as to saturate the magnetic amplifier, thus tending to raise the bus voltage. The windings 4M1, 4M2, 4M3 are connected in a second direct-current control circuit so traversed by current that the latter windings, when excited, tend to decrease the saturation of the magnetic amplifier for decreasing the bus voltage. Capacitors C4A and C4B are connected across the respective groups of control windings to provide further protection against large voltages appearing on the collector circuits of the control transistors still to be described.

The regulatory portion of the system is excited by the charger bus voltage taken from across the buses P and N through respective positive and negative leads LP and LN. The supply of excitation voltage from leads LP and LN to the direct-current control windings of the magnetic amplifier is controlled by a two-stage auxiliary amplifier formed by a cascade-type connection of two constant-sum current networks.

One of the sum current networks, forming the first stage of the auxiliary amplifier, is composed of two matched transistors Q1, Q2 and two balanced resistors R16, R17 in series with the respective transistors. The two transistors have a common emitter resistor R7 connected to the negative lead LN. Resistors R16 and R17 are connected through a resistor R9 with the positive lead LP. The network tends to maintain the sum of the two collector currents of respective transistors Q1 and Q2 at a constant value equal to the current flowing through the common emitter resistor R7.

The base of transistor Q2 is connected through a resistor R11 to a source of constant datum voltage. This source, in the illustrated embodiment, consists of a Zener silicon diode D3 which is connected in series with a resistor R8 between the positive and negative leads LP and LN. While only one diode D3 is shown, a plurality of Zener diode units in series or parallel may be used. The diode D3 and the resistor R8 form a voltage divider in which the voltage drop across the Zener diode is kept constant irrespective of variations in bus voltage of the battery charger. The Zener voltage, for example, may be ten volts for a bus voltage of 48 volts.

The base of transistor Q1 is connected to another voltage divider which comprises resistors R3, R14 and R5 as well as a control rheostat R1, all connected in series between bus leads LP and LN. A filter capacitor C6 is connected across the series group of resistors R5, R1 and R14. It will be recognized that when the bus voltage tends to vary, the bias potential at the base of transistor Q1 tends to vary accordingly.

The emitter-base voltages of transistors Q1 and Q2 are much smaller than the datum voltage across the Zener diode D3. While, as mentioned, the Zener diode voltage may have a total value of 10 volts, the base-emitter voltages are only 0.1 to 0.2 volt. Thus the Q1—Q2 network must operate under normal balance conditions, namely when the charger output voltage has the desired correct value, so that the ten-volt Zener voltage also appears substantially across the common emitter resistor R7 of both transistors. Under the same conditions, substantially the same Zener voltage of 10 volts must also appear along the resistor R3. In other words, since the voltage drop of resistor R3 is directly proportional to the bus voltage of the battery, the voltage divider resistors R3, R14, R1 and R5 must be so rated and the rheostat 1 must be so set that the voltage drop of resistor R3 is substantially equal to the Zener volts across diode D3 when the bus voltage has the correct value of 48 volts.

Under normal, balanced conditions of the sum-current network, the collector currents flowing through the respective transistors Q1 and Q2 as well as through respective resistors R16 and R17, are equal, each being exactly one half of the current flowing through the common emitter resistor R7. When the bus voltage becomes excessive, the voltage across resistor R3 increases above 10 volts and the base of transistor Q1 is made more negative relative to the emitter, while the base of transistor Q2 becomes more positive. This makes transistor Q1 more conductive and transistor Q2 less conductive, causing more current to flow through the collector circuit of transistor Q1 and resistor R16, and less current to flow through the collector circuit of transistor Q2 and resistor R17, the sum of the two currents being still constant but the respective shares being now unbalanced. As a result, an amplified output voltage of one or the other polarity appears between the normally equipotential output points F4 and F5 of the Q1—Q2 sum current network.

This output voltage controls the transistors Q4 and Q5 of the second sum current network. One branch of the second network comprises a resistor R19 and the reactor control windings 3M1, 3M2, 3M3 in the collector circuit of transistor Q4. The second branch comprises a resistor R18 and the control windings 4M1, 4M2, 4M3 in the collector circuit of transistor Q5. Both branches extend parallel to each other from the positive lead LP to an emitter resistor R15 common to transistors Q4, Q5 and connected to the negative lead LN. The transistors Q4 and Q5 are matched, and the functioning of the Q4—Q5 network is such as to maintain a constant sum current, determined by the current flowing through the common emitter resistor R15, as explained above with reference to the Q1—Q2 network.

Figure 3:
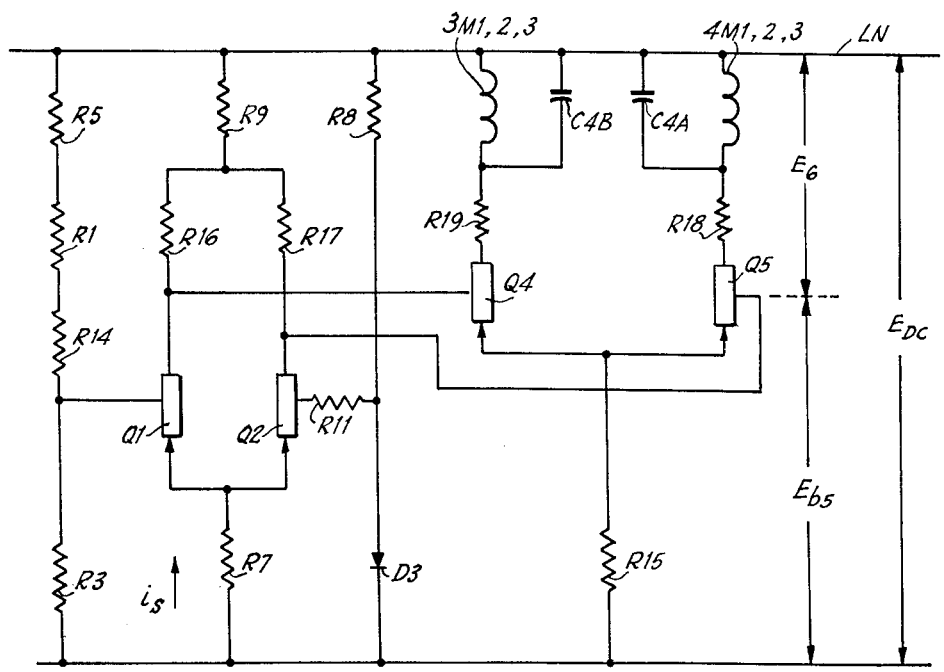
Fig. 3 is an explanatory circuit diagram of a component portion in the charger system of Fig. 1.

The resulting regulatory performance will be explained with additional reference to the voltage magnitudes identified in the schematic diagram of Fig. 3.

As mentioned, under normal equilibrium conditions the current through resistor R16 is nominally equal to the current through resistor R17, and is equal to one-half the value of current flowing through resistor R7. Under these conditions, the base potential of transistor Q4, relative to the positive potential lead LP, is equal to the base potential $E_{b5}$ of transistor Q5. In analogy to the explanation given above with reference to the Q1—Q2 network, the voltage $E_6$ between the bases of transistors Q4 and Q5 on the one hand, and the negative potential of lead LN, on the other hand, must be equal to the total direct-current bus voltage $E_{DC}$ less the voltage drop in resistors R9, and the resistors R16, R17. This means that the voltage $E_{b5}$ or the base potential of transistors Q4 and Q5, relative to the positive bus potential, is equal to the total bus voltage $E_{DC}$ minus the sum-current drop through the resistor R9 and minus one half the sum-current drop through resistor R16. With transistors Q4 and Q5 normally operating in balanced condition, the total current flowing through resistor R15 is determined by the base potential $E_{b5}$ which is essentially constant. This is because the magnitude of voltage $E_{b5}$ is much larger than the base-to-emitter voltages of either of the two transistors Q4 and Q5. For example, $E_{b5}$ is 25 or 30 volts, compared with a base-to-emitter voltage of only $\frac{1}{10}$ to $\frac{2}{10}$ of one volt.

When the system is in equilibrium with one half of the sum-current $i_s$ flowing through resistor R16 and one half flowing through resistor R17, then one half of the current flowing through resistor R15 passes through the collector of transistor Q4, and one half of the current through resistor R15 flows through the collector of transistor Q5. When the bus voltage $E_{DC}$ is somewhat too high, such that the base potential of transistor Q1 increases above the equilibrium value, transistor Q1 is turned on more than transistor Q2, causing more current to flow through resistor R16 than through resistor R17. This lowers the base potential of transistor Q4 and raises the base potential of transistor Q5. As a result, transistor Q5 is turned on more and transistor Q4 is turned off to a corresponding extent so that more current will now flow through transistor Q5 than through transistor Q4. Accordingly, more current is now flowing through the magnetic-amplifier control windings 4M1, 4M2, 4M3 than through the control windings 3M1, 3M2, 3M3. The resulting regulatory effect tends to decrease the bus voltage $E_{DC}$ to the accurate value because, as mentioned, windings 4M1, 4M2, 4M3 operate in such a sense as to desaturate the iron of reactors M1, M2, M3 and turn the magnetic amplifier off, whereas windings 3M1, 3M2, 3M3 operate in the opposite sense, tending to saturate the magnetic amplifier iron and to turn the amplifier on.

In order to prevent the above-described bus-voltage regulation from becoming inaccurate due to temperature-responsive changes in resistance of the transistors Q1 and Q2, a compensating resistor R11 is interposed between the base of transistor Q2 and the Zener diode D3. The resistor 11 is so dimensioned that the sum of the dynamic resistance of diode D3 plus the resistance of R11 is essentially equal to the resistance of R3. As a result, any change in internal resistance of the transistors becomes negligible relative to the self-regulating performance of the battery charger. This is not further explained in this specification because, although means for compensating temperature-responsive resistance changes are desirable, the particular compensating means used for this purpose are not essential to the invention proper, and because the particular compensation effected by the resistor R11 is more fully set forth in the above-mentioned co-pending application Serial No. 822,229 (F–1903).

As shown in Fig. 1, another transistor Q3 is connected parallel to the one transistor Q1 that is driven by the variable control voltage depending upon the bus voltage of the battery charger. The transistor Q3 is preferably matched with transistors Q1 and Q2 and is normally biased to cut-off so as to remain non-conductive during normal operation of the battery charger. Consequently, the presence of the parallel transistor Q3 does not interfere with the above-described voltage regulating performance of transistors Q1, Q2, Q4, Q5. However, the transistor Q3 is controlled in response to the current transferred by the power rectifier to impose upon the regulating system an overriding current-limit control in the event the load imposed upon the power rectifier exceeds a predetermined value.

For the purpose of such current-limit control, the primary winding 1T2 of a current transformer TR2 is interposed between the secondary circuit of transformer TR1 and one of the bridge feed points F1 of the magnetic amplifier. The secondary winding 2T2 of current transformer TR1 has a mid-tap to which an adjustable resistor R10 and a choke coil L3 are connected in series. The other end of the L3—R10 circuit is connected with the two end points of the secondary winding 2T2 through respective diodes D2A and D2B consisting of solid-state rectifiers. Since the primary 1T2 is directly in series with the secondaries of transformer TR1, the voltage in the secondary winding 2T2 is proportional to the direct load current supplied by the charger. The secondary 2T2, the resistor R10, the choke L3 and the diodes D2A, D2B form together a center-tapped rectifier network whose rectified output voltage appears across the active portion of resistor R10 and is filtered by means of a capacitor C2 in cooperation with the choke coil L3. The direct-current voltage across resistor R10 is proportional to the direct current drawn from the battery charger. One end of resistor R10 is connected to the base of the transistor Q3 through a resistor R40. The other end of resistor R10 is connected to the positive bus lead LP. A capacitor C15 is connected between capacitor C2 and the collector of transistor Q2.

For explaining the operation of the transistor Q3, first assume that the transistor Q1 is removed from the regulating system. Then we can describe a second equilibrium condition with reference to the voltage across resistor R10 and the Zener voltage across diode D3. Again assuming that the total Zener voltage is 10 volts and that substantially the same voltage appears across the common emitter resistor R7 of transistors Q2 and Q3, the regulating system would function to hold the voltage across the resistor R10 at 10 volts, i.e. equal to the Zener voltage, and thus would hold the current output of the power rectifier at a constant value. This would be done by controlling the control windings of the magnetic amplifier in the same manner as these windings were controlled for voltage regulation. If the current output of the charger were too high, the voltage across resistor R10 would increase and this would somewhat raise the base potential of transistor Q3 while lowering the base potential of transistor Q2. Consequently, the collector current of transistor Q3, controlling through transistor Q4 the windings 3M1, 3M2 and 3M3, would have a higher magnitude than the current now flowing in the collector circuit of transistor Q2 and controlling through transistor Q5 the windings 4M1, 4M2, 4M3. As a result, the control windings would cause lowering the output of the battery charger as required to keep the output current constant at the value where the voltage across resistor R10 is equal to the Zener voltage.

Now, since the transistor Q1 is connected in the regulating circuit but has a higher base potential, i.e. a less positive potential, than the transistor Q3, the transistor Q3 remains cut off and is substantially inoperative in the regulating circuit under normal operating conditions. Only when the charger reaches a state where the voltage across resistor R10 is just slightly larger than the voltage across resistor R3, can the transistor Q3 assume control of the regulating network and make the transistor Q1 inoperative. That is, at this point the transistor Q1 is biased to cut-off, and the transistor Q3 cooperates with transistor Q2 to effect an overriding control for constant current.

Consequently, the combination of circuits is such that up to the point where the current-limiting regulation becomes operative, the battery charger has a strictly regulated voltage output, where as at the point where the current limit performance becomes operative, the battery charger continues to operate as a current regulator, thus protecting the entire system, including the transistor circuits, from overloads. The value of regulated bus voltage is adjustable by means of the rheostat R1 and the bus-load value at which the current-limit control takes over is adjustable by setting the resistor R10.

Figure 5:
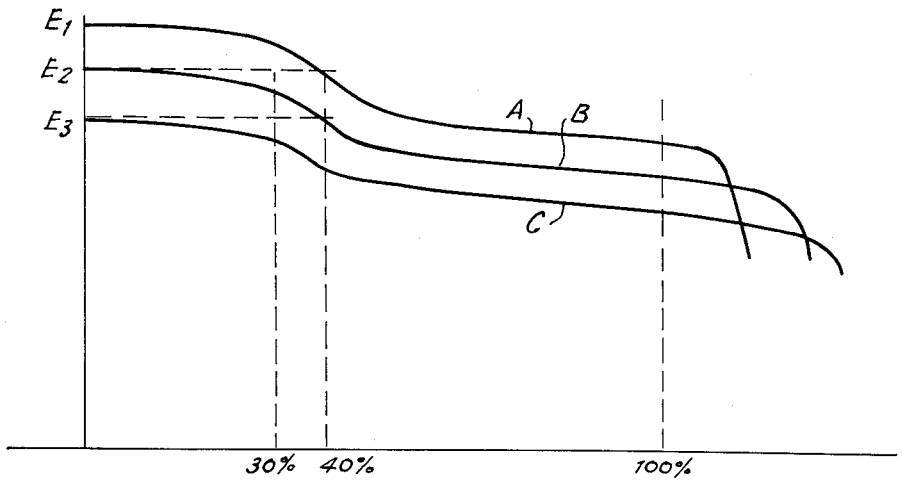
Fig. 5 is a similar, comparative graph relating to charger systems not incorporating the present invention and incapable of self-sequencing.

In the foregoing description of the current-limiting performance, no reference has been made to the significance of the choke coil L3, the capacitor C15 and the resistor R40. Indeed, an overriding current-limit regulation, as described so far, can be obtained without all of these components, as will be apparent from the system according to the above-mentioned copending application Serial No. 822,229 (F–1903). However, the components L3, C15 and R40 jointly perform a function critical to one of the main purposes of the present invention, because, without the choke L3 and the associated components, the system would not be capable of performing the current-limiting action with such a voltage-current characteristic as to afford automatic sequencing of parallel-connected battery chargers. This is because, without the choke coil L3, the voltage across resistor R10 is a peak-rectified voltage and thus tends to be proportional to the peak voltage appearing in the secondary 2T2 of the current transformer TR2 and not to the average value of the alternating current transferred by the battery charger. As a result, the voltage-current characteristic of such a charger system would have a considerable amount of greatly non-uniform droop as typified by the curves shown in Fig. 5. Such characteristics, as will be explained, make a group of such chargers unsuitable for the desired sequencing operations and would necessitate using extraneous selector mechanisms which the present invention aims to eliminate. To achieve this aim, the voltage across resistor R10 must be made accurately proportional to the average value of alternating current flowing through the transformer TR2 and hence to the average value of the alternating voltage supplied by the transformer secondary 2T2.

Figure 4:
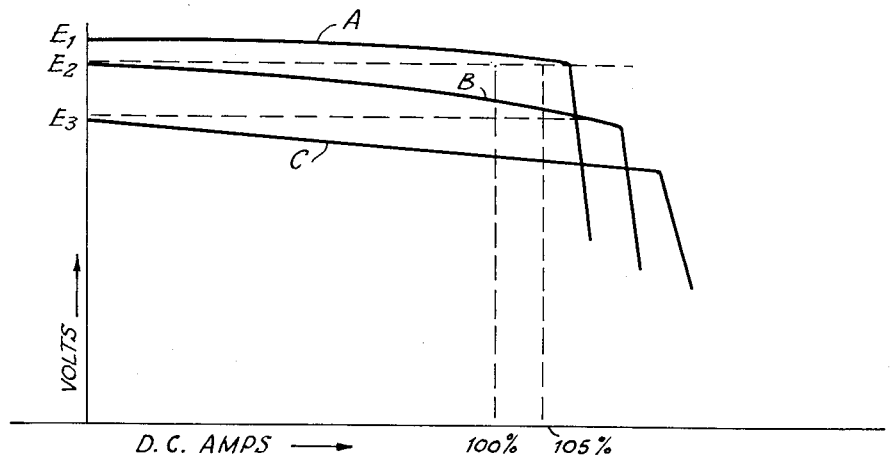
Fig. 4 is a voltage-current graph explanatory of the self-sequencing operation obtained with a charger system according to the invention as shown in Fig. 2.

By virtue of the choke coil L3 connected in series with resistor R10 in the load circuit of the rectifier network energized from winding 2T2, the control current passing to the base of the load-current regulating transistor Q3 is supplied through an essentially inductive input filter. As a result, the voltage-current characteristic of the charger assumes a shape possessing a slight and continuously uniform droop from zero load current up to the limit current, as typified by the curves illustrated in Fig. 4 and explained presently.

Figure 2:
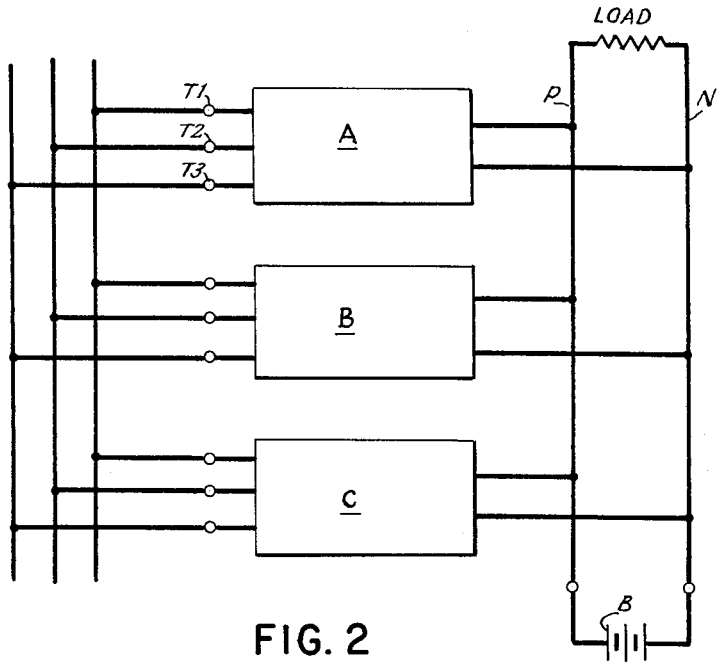
Fig. 2 is a block diagram of three chargers according to Fig. 1 connected in parallel to the same battery buses.

Schematically illustrated in Fig. 2 are three battery chargers A, B and C connected in parallel between an alternating-current utility line and the battery buses P and N of a central-office battery B. The three battery chargers have the same design and performance as described above with reference to Fig. 1, except that the control rheostats R1 in the respective chargers are differently adjusted to slightly different float voltages as will appear from the following.

When the total load on the battery buses is lower than the current-limit value to which the charger A is set by corresponding adjustment of its resistor R10, the bus voltage is regulated at a point which at no-load has a $E_1$ (Fig. 4), for example of 49 volts, set by means of rheostat R1. Charger A carries the load until approximately 105% of the current rating for charger A is reached. At this point the slight and steady droop in regulator action of charger A has reduced the bus voltage to a value $E_2$ of 48.8 volts, for example. When the load increases beyond this point, charger B assumes a portion of the load as charger A goes into current limit. With further increase in load, charger B may also reach a load value of approximately 105% at which the droop of charger B causes the bus voltage to be reduced to a value $E_3$ of 48.6 volts. At this point, charger C begins assuming a percentage of the load and will carry its share until reaching the current-limit value.

When charger A is carrying a load less than 105%, chargers B and C are not under load at all because their respective control rheostats R1 are set to floating voltages lower than the bus voltage furnished by charger A so that the transistors Q1 and Q2 in each of chargers B and C receive cut-off bias. Analogously, when charger B is carrying a load less than 105%, charger C is not under load. It will be obvious that the sequence in which the three, or any desired number of parallel-connected chargers, will commence operating, is determined by the chosen settings of respective rheostats R1 and can be changed simply by changing the relative settings of these rheostats. It will further be seen that the sequencing performance is due to the inherent behavior of the chargers but does not require any extraneous switching or sequencing equipment of the kind heretofore needed for such purposes.

As mentioned above, Fig. 5 represents a type of voltage-regulation characteristics encountered in systems not using signals strictly proportional to the average current being transferred by the chargers. Again referring to the example of three parallel connected battery chargers according to Fig. 2, the charger A according to Fig. 5 first assumes the load. However, at about 30% of the load rating of charger A there is a pronounced and rather abrupt droop in regulation such that charger B begins assuming load after charger A has reached as little as 40%, for instance, of its rated load. Similarly, charger C begins assuming a portion of the load after charger B has reached only a small percentage, for example 40%, of its rated load. Consequently, no satisfactory sequencing of the three chargers is possible without spreading the voltages $E_1$, $E_2$ and $E_3$ farther apart than permissible in battery-floating practices.

It should be understood that in order to achieve accurate sequencing in accordance with the invention, the charger regulating system must be capable of accurate voltage regulation to begin with, and the current-limit action must be positive, these conditions being met by the sensitive voltage-regulating and current-limiting components of the system described above. For most efficient use in central offices, the chargers that do not carry load at a time must not draw appreciable current when in cut-off condition. This is best accomplished, as in the embodiment described above, by using silicon power rectifiers whose leakage currents are many times smaller than those of otherwise comparable selenium rectifiers, and by using transistors or equivalent controllable semiconductor devices in the control circuits which require no appreciable amount of power.

By virtue of the extreme accuracy of voltage regulation described above, my invention also affords the provision and reliable operation of a charger failure relay under the exacting conditions mentioned earlier in this specification. The relay circuit comprises another current transformer TR5 (Fig. 1) whose primary winding 1T5 is connected in series between the secondary windings of the power input transformer TR1 and one of the feed points F3 of the power rectifier network. The secondary winding 2T5 of the current transformer is directly connected to an alternating-current relay NCR which controls a device NCS for signalling the faulty condition or initiating a suitable control operation as may be desired. Preferably, and as shown, the coil circuit of relay NCR does not comprise any rectifiers, resistors, or capacitors and hence is as fail-safe as possible. The relay NCR will respond to any such conditions as loss of alternating voltage or excessive reduction of that voltage, blowing of fuses in the direct-current output circuit or in component control circuits of the charger, tripping of a breaker or contactor in the alternating-current feeder circuit, or any other condition resulting in inadequate charging or resulting in improper discharging of the battery. The trip value of current for relay NCR is readily adjustable, for example between plus 3% to minus 1% simply by adjusting the force of the return spring in the relay.

For securing this performance, the core of current transformer TR5 consists of a square-loop material such as available under the trade names Orthonol and Deltama, or some other nickel-containing steel alloy having a substantially rectangular magnetization characteristic. The ampere turns of the primary 1T5 are such that the core material abruptly saturates at a very small value of current compared with the full-load value, such as about 1% of the rated full-load alternating current, for example. Such saturation at a very low percentage of current prevents a large alternating voltage from appearing across the primary 1T5 at full load, and also prevents large secondary voltages from being imposed at full load on the no-charge relay NCR.

When the battery charger is inactive, the contact of relay NCR is closed, but the relay picks up at an extremely small current value and remains normally picked up as long as the charger is in operative condition. Failure of the charger, which is to result in relay NCR dropping out, will be indicated by the fact that the alternating current through the primary winding 1T5 drops below the above-mentioned slight limit value of saturation.

The system affords full protection under such exacting requirements as explained above with reference to the floating of lead-calcium batteries as will now be more fully explained.

The RMS alternating current flowing through winding 1T5 is proportional to the total direct current flowing from the buses N, P into the battery plus the current required to supply the transistor circuits which feed current through the control windings of the magnetic amplifier. This latter amount of current, for a given direct-voltage output of the charger, is extremely constant by virtue of the accurate voltage regulation described above. This permits adjusting the sensitivity of relay NCR and the secondary voltage of current transformer TR5 so that the amount of current flowing through the transistor circuits can be made exactly adequate to maintain the relay NCR picked up, this current being supplied from the utility line and not from the battery. By virtue of these conditions, the relay NCR can readily be made to protect lead-calcium batteries. If the charger voltage drops ever so slightly below the voltage of the lead-calcium battery, the battery itself supplies the current through these transistor and sensing circuits so that no alternating current flows through winding 1T5, and the relay NCR drops out.

The resultant effect of the above-described combination of system components is such that the sensitivity of the failure-responsive relay NCR can be adjusted so that the relay will fall out either at a slightly positive output of current such as ½%, ¼% or less of the full-rated output current, or at the zero value of output current, or at a slightly negative value of direct current.

While, as explained, a no-charge relay according to the invention, energized from a load-current transformer with magnetic square-loop core material, is particularly advantageous for extreme accuracy requirements in charger systems of the type described, such a relay device may also be used as a failure alarm relay in any other type of regulated or unregulated rectifying chargers, and is also useful in cases of lesser accuracy requirements. For example, when particularly quiet operation is desired, the no-charge relay may be direct-current operated by connecting a rectifier between saturable transformer TR and relay NCR.

It will be understood that the particular design of the magnetic amplifier used as a controllable state-state power rectifier in the illustrated battery charger is not essential to the invention proper and may be modified or substituted by other magnetic amplifier networks in conventional manner. The invention is also applicable to other types of controllable semiconductor junction rectifiers available for controlled power rectification. It will also be obvious to those skilled in the art, upon studying this disclosure, that my invention permits of various other modifications with respect to circuit components and circuitry, and hence may be embodied in apparatus other than particularly described herein, without departing from the essential features of my invention and within the scope of the claims amended hereto.

I claim:

1. A battery charger unit comprising a controllable solid-state power rectifier having an alternating-current feeder circuit, two direct-current battery buses, and two rectifier control circuits of mutually differential operation for jointly controlling the power transfer from said feeder circuit through said rectifier to said buses; differential amplifier means connected across said buses to be energized by the bus voltage, said amplifier means having two output branches which include said respective rectifier control circuits and having two controllable semiconductor devices for differentially controlling the currents flowing between said buses through said respective rectifier control circuits, said two semiconductor devices having respective conductance-control circuits, control-voltage supply means connecting the conductance-control circuit of a first one of said semiconductor devices to said buses for controlling said amplifier means in dependence upon variations of said bus voltage, a source of constant reference voltage connected to the conductance-control circuit of the second semiconductor device whereby said amplifier means normally regulate said power rectifier for constant bus voltage; a normally inactive, third controllable semiconductor device connected in parallel to said first semiconductor device and having a third conductance-control circuit, a current transformer connected with said alternating-current feeder circuit and having a secondary winding whose voltage depends upon the alternating power current fed to said power rectifier, a rectifier network connected to said secondary winding to be energized therefrom and having a direct-current load circuit comprising an adjustable resistor and a choke coil in series with said resistor whereby the voltage drop of said resistor in said load circuit is proportional to the average value of said alternating power current, said third control circuit extending through said resistor for controlling said third semiconductor device to impose an overriding current-limit control upon said amplifier means when the load current of the battery charger exceeds a given value corresponding to the resistance adjustment of said resistor.

2. A battery charger unit according to claim 1, comprising capacitor means connected with said direct-current load circuit of said rectifier network and forming together with said choke coil a choke input filter circuit relative to said resistor.

3. A battery charger unit comprising alternating-current supply means, a rectifying magnetic amplifier connected to said supply means and having respective positive and negative battery buses, said magnetic amplifier having two control windings of mutually opposed inductive relation for jointly regulating the bus voltage, differential amplifier means connected across said buses to be energized by the bus voltage, said amplifier means having two output branches which include said respective rectifier control circuits and having two controllable semiconductor devices for differentially controlling the currents flowing between said buses through said respective control circuits, said two semiconductor devices having respective conductance-control circuits, control-voltage supply means connecting the conductance-control circuit of a first one of said semiconductor devices to said buses for controlling said amplifier means in dependence upon variations of said bus voltage, a source of constant reference voltage connected to the conductance-control circuit of the second semiconductor device whereby said amplifier means normally regulate said magnetic amplifier for constant bus voltage; a normally inactive, third controllable semiconductor device connected in parallel to said first semiconductor device and having a third conductance-control circuit, a current transformer connected with said alternating-current supply means and having a secondary winding whose voltage depends upon the current fed to said magnetic amplifier, a rectifier network connected to said secondary winding to be energized therefrom and having a direct-current branch comprising an adjustable resistor, a filter circuit having capacitance means and inductance means, said inductance means being connected in series with said resistor in said branch to make the direct voltage impressed upon said resistor proportional to the average value of said alternating current, said third control circuit extending through said resistor for controlling said third semiconductor device to impose an overriding current-limit control upon said amplifier means when the load current of the battery charger exceeds a given value corresponding to the resistance adjustment of said resistor.

4. A battery charger unit comprising alternating-current supply means, rectifying magnetic amplifier connected to said supply means and having respective positive and negative battery buses, said magnetic amplifier having two control windings of mutually opposed inductive relation for jointly regulating the bus voltage, a sum-current network comprising a first transistor and a second transistor having respective collectors connected through said respective windings with one of said buses and having respective emitters which are both connected to said other bus, a common emitter resistor serially interposed between said latter bus and said two emitters, a voltage divider extending between said buses and having a divider point of voltage substantially equal to said reference voltage when the bus voltage has the correct value, said first transistor having its base connected to said divider point, a source of constant reference voltage, said second transistor having its base connected through said source to said other bus, whereby said network regulates said magnetic amplifier for constant bus voltage, a normally inactive, third transistor connected in parallel with said first transistor and having an emitter connection in common therewith, said third transistor comprising a base-emitter circuit having a cut-off bias voltage, a current transformer connected with said alternating-current supply means, an auxiliary rectifier connected to said transformer and having a direct-current branch comprising a resistor and an inductance coil in series with each other, capacitor means connected with said branch and forming together with said coil a choke input filter relative to said resistor so that the direct voltage across said resistor is proportional to the average value of the alternating current fed to said magnetic amplifier, said resistor being connected in said base-emitter circuit of said third transistor, whereby said direct voltage of said resistor controls said third transistor to limit the load current of the charger to a given value set by means of said resistor.

5. A battery charger comprising alternating-current power supply means, a pair of direct-current battery buses, a power-rectifying magnetic amplifier having saturable reactor means and silicon power diodes connecting said supply means with said buses, said reactor means having two direct-current control circuits for jointly controlling the voltage of said buses; two constant-sum current networks forming two respective amplifier stages, each of said networks comprising two normally balanced branches with respective transistors having interconnected emitters and a common emitter resistor connected between said emitters and one of said buses, the first-stage network having two resistors connected between the collectors of its respective transistors and the other bus, bus-voltage responsive circuit means connected to the bases of said respective transistors for unbalancing the flows of current through said two branches when the bus voltage departs from the desired value, the second-stage network having its two branches formed by said respective reactor control circuits and extending from the common emitter resistor through the two transistors of said second network to the other bus, said transistors of said second network having their respective bases connected to the respective collectors of said two transistors of said first network whereby said magnetic amplifier is normally controlled to maintain said bus voltage constant; a normally inactive further transistor connected in parallel with one of said transistors of said first network in emitter-to-emitter connection therewith, said further transistor having a base circuit connected to said one bus and comprising a resistor; and current-responsive means having a unidirectional output voltage proportional to the load current passing from said supply means through said buses, said resistor being connected to said current-responsive means to impress said current-proportional voltage upon said base circuit whereby said further transistor becomes active in lieu of said one transistor for limiting the load current of the charger to a given value.

6. In a battery charger unit according to claim 5, said current responsive means comprising a current transformer connected with said power supply means, a rectifier connected to said transformer, and a choke input filter coupling said rectifier with said resistor whereby the direct voltage of said resistor is proportional to the average value of the alternating current passing through said magnetic amplifier.

7. A battery charger unit comprising a controllable solid-state power rectifier having an alternating-current feeder circuit, two direct-current battery buses, and two rectifier control circuits of mutually differential operation for jointly controlling the power transfer from said feeder circuit through said rectifier to said buses; differential amplifier means connected across said buses to be energized by the bus voltage, said amplifier means having two output branches which include said respective rectifier control circuits and having two controllable semiconductor devices for differentially controlling the currents flowing between said buses through said respective control circuits, said two semiconductor devices having respective conductance-control circuits, control-voltage supply means connecting the conductance-control circuit of a first one of said semiconductor devices to said buses for controlling said amplifier means in dependence upon variations of said bus voltage, a source of constant reference voltage connected to the conductance-control circuit of the second semiconductor device whereby said amplifier means normally regulate said power rectifier for substantially constant bus voltage so that the alternating current in said feeder circuit declines to a slight percentage of the rated current when the buses supply floating voltage under charged-battery conditions, a saturable current transformer connected with said feeder circuit, a failure-responsive alternating-current relay connected with said transformer, said transformer being saturated at said percentage of current to supply pickup voltage to said relay during charging and floating operations, whereby said relay responds when the charger output current drops below a given value less than said percentage.

8. A battery charger according to claim 3, comprising another current transformer connected with said alternating-current supply means, a protective relay connected to said other transformer, said other transformer being saturable at a given value of current below that obtaining during battery-floating operation of the charger, whereby said relay responds when the charger load current drops to said given value.

9. A battery charger comprising a group of charger units according to claim 1, having said two battery buses in common and being connected in parallel relative to said buses, said control voltage supply means of each of said units comprising a voltage-control rheostat for selectively setting the bus voltage to be regulated by said unit, and said control rheostats of said respective units being adjusted to graduated voltage values respectively for automatic load sequencing operation of said group.

10. A battery charger comprising a group of charger units according to claim 5, having said pair of battery buses in common and being connected in parallel relative to said buses, said bus-voltage responsive circuit means in each unit consisting essentially of a voltage divider connected across said buses and having an adjustable rheostat for setting said desired bus voltage, said rheostats of said respective units having respectively different settings for automatic load sequencing operation of said group.

11. A battery charger, comprising an alternating-current feeder line, a pair of direct-current battery buses, a plurality of charger units having respective controllable power rectifiers of static type connected in parallel between said feeder line and said buses, each of said units having rectifier control means comprising bus-voltage responsive sensing means for starting and normally regulating the rectifier for a given range of rectifier output voltage, and said control means having current-responsive means for limiting the load current to a given maximum value, said current-responsive means being connected in each unit between said power rectifier and said feeder line and having upon said control means a control action corresponding to the average value of alternating current passing from said line through said unit, each of said units having a substantially uniformly drooping voltage characteristic from zero to limit current and having said voltage sensing means set to a rectifier starting value different from that of the other units, whereby said units commence operating in sequence depending upon the bus current of the charger.

References Cited in the file of this patent

UNITED STATES PATENTS

| | | |
|---|---|---|
| 2,875,395 | Blashfield | Feb. 24, 1959 |
| 2,875,396 | Christie et al. | Feb. 24, 1959 |
| 2,909,720 | Fthenakis | Oct. 20, 1959 |
| 2,914,720 | Merkel | Nov. 24, 1959 |
| 2,929,963 | Kaestle | Mar. 22, 1960 |